United States Patent
Liu et al.

(10) Patent No.: US 12,497,880 B2
(45) Date of Patent: Dec. 16, 2025

(54) FRACTURING SYSTEM AND CONTROL SYSTEM AND METHOD FOR THE FRACTURING SYSTEM

(71) Applicant: YANTAI JEREH PETROLEUM EQUIPMENT & TECHNOLOGIES CO., LTD., Shandong (CN)

(72) Inventors: Kaishen Liu, Yantai (CN); Xiance Li, Yantai (CN); Shuzhen Cui, Yantai (CN); Zhuqing Mao, Yantai (CN); Weiwei Liu, Yantai (CN); Liang Li, Yantai (CN); Pengyuan Zhang, Yantai (CN); Dawei Zhao, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 18/745,699

(22) Filed: Jun. 17, 2024

(65) Prior Publication Data
US 2024/0337179 A1 Oct. 10, 2024

Related U.S. Application Data

(63) Continuation of application No. 18/329,858, filed on Jun. 6, 2023, now Pat. No. 12,044,114, which is a
(Continued)

(30) Foreign Application Priority Data

Apr. 2, 2021 (CN) .......................... 202110361078.6

(51) Int. Cl.
E21B 43/267 (2006.01)

(52) U.S. Cl.
CPC .................................. E21B 43/267 (2013.01)

(58) Field of Classification Search
CPC ...... E21B 43/267; E21B 21/062; E21B 43/26;
E21B 43/2607; B65G 43/08; B65G 65/42
See application file for complete search history.

(56) References Cited

U.S. PATENT DOCUMENTS

| 11,739,623 B2 | 8/2023 | Liu et al. |
| 2014/0138079 A1 | 5/2014 | Broussard et al. |

(Continued)

FOREIGN PATENT DOCUMENTS

| CA | 2824181 A1 * | 7/2012 | ............... C09K 8/62 |
| CA | 3041239 A1 * | 7/2018 | ............. E21B 41/00 |

(Continued)

OTHER PUBLICATIONS

Yang, "Research on the Effectiveness of Integrated Linkage Fracturing Construction with Automatic Remote Fluid Supply," Modern Economic Information, 16(2017):343. doi:CNKI: SUN:XDJZ.0.2017-16-277, Aug. 25, 2017.

(Continued)

*Primary Examiner* — Zakiya W Bates
(74) *Attorney, Agent, or Firm* — Sheppard Mullin Richter & Hampton LLP

(57) ABSTRACT

A control system includes: a fracturing control device configured to acquire a target fracturing pressure of a fracturing unit, perform loop control on the fracturing unit by taking the target fracturing pressure as a control target, and set a target sand blending pressure for the sand blending unit; a sand blending control device configured to perform loop control on the sand blending unit by taking the target sand blending pressure as a control target.

20 Claims, 3 Drawing Sheets

Related U.S. Application Data continuation of application No. 17/384,870, filed on Jul. 26, 2021, now Pat. No. 11,739,623.

(56) References Cited

U.S. PATENT DOCUMENTS

| | | |
|---|---|---|
| 2017/0291779 A1 | 10/2017 | Lucas et al. |
| 2020/0284122 A1 | 9/2020 | Golden et al. |
| 2021/0332681 A1* | 10/2021 | Hamza .................. C09K 8/80 |

FOREIGN PATENT DOCUMENTS

| | | |
|---|---|---|
| CN | 101706662 A | 5/2010 |
| CN | 103412522 A | 11/2013 |
| CN | 109630083 A | 4/2019 |
| CN | 110043236 A | 7/2019 |
| CN | 110513097 A | 11/2019 |
| CN | 110924917 A | 3/2020 |
| CN | 111005710 A | 4/2020 |
| CN | 112412427 A | 2/2021 |
| WO | 2019119116 A1 | 6/2019 |

OTHER PUBLICATIONS

Written Opinion of the International Search Authority and International Search Report for International Application No. PCT/CN2021/085184 mailed on Dec. 20, 2021.

Non-Final Office Action for U.S. Appl. No. 17/384,870 mailed on Feb. 1, 2023.

First Search for Chinese Application No. 202110361078.6 mailed on Nov. 30, 2023.

International Preliminary Report on Patentability Chapter I for PCT Application No. PCT/CN2021/085184 mailed on Oct. 12, 2023.

Non-Final Office Action for U.S. Appl. No. 18/329,858 mailed on Dec. 20, 2023.

Notice of Allowance for U.S. Appl. No. 18/329,858 mailed on Mar. 28, 2024.

Notice of Allowance for Canadian Application No. 3157096 mailed on May 27, 2025.

* cited by examiner

FRACTURING SYSTEM AND CONTROL SYSTEM AND METHOD FOR THE FRACTURING SYSTEM

CROSS REFERENCE TO RELATED APPLICATION

The present application is a continuation of U.S. patent application Ser. No. 18/329,858 filed on Jun. 6, 2023, entitled "FRACTURING SYSTEM AND CONTROL SYSTEM AND METHOD FOR THE FRACTURING SYSTEM," which is a continuation of U.S. patent application Ser. No. 17/384,870 filed on Jul. 26, 2021, issued as U.S. Pat. No. 11,739,623 on Aug. 29, 2023, entitled "FRACTURING SYSTEM AND CONTROL SYSTEM AND METHOD FOR THE FRACTURING SYSTEM," which claims priority to the Chinese patent application No. 202110361078.6, filed on Apr. 2, 2021. All of the above-referenced applications are hereby incorporated by reference in their entirety.

FIELD

The present application relates to a control system in the field of wellsite operation such as drilling oilfields, etc., specifically, the present application relates to a control device of a fracturing system and a method for controlling the fracturing system in wellsite operation.

BACKGROUND

Fracturing system is often used in drilling oilfields and other wellsite operation to form fractures in hydrocarbon reservoirs, which generally includes equipment such as fracturing unit for pumping high-pressure fluid into wellbore and sand blending unit for mixing proppants and fracturing fluid and supplying the mixed fluid to the fracturing unit. In the traditional mode, control on each device of fracturing system is carried out manually and respectively, thereby difficult to realize linkage control and management of the whole fracturing system.

Current mainstream fracturing system control software is able to realize control functions on devices, while it cannot perform intelligent and coordinated control on devices between upstream and downstream, nor does it have the function of intelligent control on displacement and pressure for fracturing units or fracturing mechanisms. At the same time, current fracturing system control software has not been paid attention to aspects of intelligent self-diagnosis of single device as well as remote transmission and maintenance of data.

SUMMARY

The objective of the present application is realizing linkage control on various devices of a fracturing system used in wellsite, improving working efficiency in wellsite, ensuring operating safety of a fracturing system, and at least solving some of the above-mentioned technical problems.

According to a first aspect of the present invention, a control system for controlling a fracturing system in wellsite operation is provided, wherein, the fracturing system comprises a fracturing unit for fracturing hydrocarbon reservoirs and a sand blending unit for blending fracturing fluid with proppants and supplying the resulted fluid to the fracturing unit, the control system is configured to perform control on the fracturing unit and the sand blending unit according to a target wellhead pressure, wherein the control system comprising:
a fracturing control device configured to acquire a target fracturing pressure of the fracturing unit, perform loop control on the fracturing unit with the target fracturing pressure as a control target, and set a target sand blending pressure for the sand blending unit according to the target fracturing pressure; and
a sand blending control device configured to perform loop control on the sand blending unit with the target sand blending pressure as a control target.

In some embodiments of the present application, the fracturing system further comprises a mixing unit for preparing and supplying fracturing fluid to the sand blending unit, the control system further comprises a mixing control device, wherein the sand blending control device is configured to set a target mixing discharge amount for the mixing unit, and the mixing control device is configured to perform loop control of the mixing unit and set a desired raw material supply amount for the fracturing system with the target mixing discharge amount as a control target.

In some embodiments of the present application, the loop control of the control system is performed as follows:
the fracturing control device acquiring a fracturing pressure deviation between the target fracturing pressure and a current fracturing pressure of the fracturing unit;
acquiring a fracturing pressure increment of the fracturing unit based on the fracturing pressure deviation;
superimposing the target fracturing pressure and the fracturing pressure increment, and setting the target sand blending pressure for the sand blending unit;
the sand blending control device acquiring a target sand blending input amount of the sand blending unit according to the target sand blending pressure;
acquiring a sand blending pressure deviation between the target sand blending pressure and a current sand blending pressure of the sand blending unit;
acquiring a sand blending input amount increment of the sand blending unit based on the sand blending pressure deviation;
superimposing the target sand blending input amount and the sand blending input amount increment, and setting a target blending discharge amount for the blending unit; and
the mixing unit acquiring a target blending input amount of the blending unit according to the target blending discharge amount;
acquiring a mixing amount deviation between the target mixing discharge amount and a current mixing discharge amount of the mixing unit;
acquiring a mixing input amount increment of the mixing unit based on the mixing amount deviation;
superimposing the target mixing input amount and the mixing input amount increment, and setting the desired raw material supply amount for the fracturing system.

In some embodiments of the present application, static look-up table models respectively corresponding to the fracturing unit and/or the sand blending unit and/or the blending unit are provided, wherein the target fracturing pressure and/or the target sand blending input amount and/or the target mixing input amount are acquired from the static look-up table models.

In some embodiments of the present application,
the fracturing pressure increment is acquired from a dynamic look-up table model at an operating condition point of the target fracturing pressure based on the fracturing pressure deviation; and/or the sand blending input amount increment is acquired from a dynamic look-up table model at an operating condition point of the target sand blending input amount based on the sand blending pressure deviation by using a dynamic look-up table model; and/or at the operating condition point of the target blending input amount, the mixing input amount increment is acquired from a dynamic look-up table model at an operating condition point of the target mixing input amount based on the mixing amount deviation.

In some embodiments of the present application, the control system is configured to monitor an actual output amount of the fracturing unit and/or the sand blending unit and/or the mixing unit to identify whether an error occurs.

In some embodiments of the present application, the fracturing control device further comprises a fracturing pressure distribution unit configured to distribute fracturing fluid to various fracturing mechanisms of the fracturing unit according to the target fracturing pressure.

In some embodiments of the present application, the control system further comprises a clear water tank control unit configured to controls the clear water tank of the fracturing system to be supplied with water under a condition that a liquid level of the clear water tank is lower than a preset minimum liquid level.

In some embodiments of the present application, the fracturing control device is configured to acquire the target fracturing discharge amount of the fracturing unit according to wellhead pressure, manual input, process requirements or software calculation.

According to a second aspect of the present invention, there is provided a fracturing system comprising a fracturing unit for fracturing hydrocarbon reservoirs and a sand blending unit for blending fracturing fluid with proppants and supplying blended mixture to the fracturing unit, wherein, the fracturing system further comprises a control system according to any of the embodiments of the present application.

In some embodiments of the present application, the sand blending unit comprises a sand conveying belt and a packing auger, wherein, the sand conveying belt supplies sand proppants to the packing auger, and a rotation speed of the auger is adjusted by the sand blending control device.

According to a third aspect of the present invention, there is provided a method for controlling a fracturing system in wellsite operation, wherein, the method comprises the following steps:

S1: acquiring a target fracturing pressure of a fracturing unit;

S2: performing loop control on the fracturing unit with the target fracturing pressure as a control target, and setting a target sand blending pressure for the sand blending unit; and S3: performing loop control on the sand blending unit with the target sand blending pressure as a control target.

In some embodiments of the present application, the method further comprises the following steps:

S4: Setting a target mixing discharge amount for a mixing unit, and performing loop control on the mixing unit with the target mixing discharge amount as a control target and setting a desired raw material supply amount for the fracturing system.

In some embodiments of the present application, the loop control on the fracturing unit and/or the sand blending unit and/or the blending unit comprises the following steps:

S21: acquiring the target fracturing pressure of the fracturing unit;

S22: acquiring a fracturing pressure deviation between the target fracturing pressure and a current fracturing pressure of the fracturing unit;

S23: acquiring a fracturing pressure increment of the fracturing unit based on the fracturing pressure deviation;

S24: superimposing the target fracturing pressure with the fracturing pressure increment, and setting a target sand blending pressure for the sand blending unit; and/or S31: acquiring a target sand blending input amount of the sand blending unit according to the target sand blending pressure;

S32: acquiring a sand blending pressure deviation between the target sand blending pressure and a current sand blending pressure of the sand blending unit;

S33: acquiring a sand blending input increment of the sand blending unit based on the sand blending pressure deviation;

S34: superimposing the target sand blending input amount with the sand blending input amount increment, and setting a target mixing discharge amount for the mixing unit; and/or S41: acquiring a target mixing input amount of the mixing unit according to the target mixing discharge amount;

S42: acquiring a mixing amount deviation between the target mixing discharge amount and a current mixing discharge amount of the mixing unit;

S43: acquiring a mixing input amount increment of the mixing unit based on the mixing amount deviation;

S44: superimposing the target mixing input amount with the mixing input amount increment, and setting the desired raw material supply amount for the fracturing system.

In some embodiments of the present application, static look-up table models respectively corresponding to the fracturing unit and/or the sand blending unit and/or the blending unit are provided, wherein the target fracturing pressure and/or the target sand blending amount and/or the target mixing input amount are acquired from the static look-up table models.

In some embodiments of the present application, the fracturing pressure increment is acquired from a dynamic look-up table model at an operating condition point of the target fracturing pressure based on the fracturing pressure deviation; and/or the sand blending input amount increment is acquired from a dynamic look-up table model at an operating condition point of the target sand blending input amount based on the sand blending pressure deviation by using a dynamic look-up table model; and/or the mixing input amount increment is acquired from a dynamic look-up table model at an operating condition point of the target mixing input amount based on the mixing amount deviation.

In some embodiments of the present application, in the loop control, an actual output amount of the fracturing unit and/or the sand blending unit and/or the blending unit is monitored to identify whether an error occurs.

In some embodiments of the present application, the method further comprises the following step:

according to the target fracturing pressure, distributing fracturing fluid among various fracturing mechanisms in the fracturing unit.

In some embodiments of the present application, the method further comprises the following step:

in a case that a liquid level of a clear water tank of the fracturing system is lower than a preset minimum liquid level, controlling to feed water to the clear water tank.

In some embodiments of the present application, in the step S1:

the target fracturing pressure of the fracturing unit is acquired according to wellhead pressure, manual input, process requirements or software calculation.

BRIEF DESCRIPTION OF THE DRAWINGS

In order to better understand the above and other objectives, features and advantages of the present application, preferred embodiments as shown in the accompanied drawings are provided. Throughout the drawings, the same or similar reference symbols refer to the same or similar elements. It would be appreciated by those skilled in the art that the drawings are provided to illustrate the preferred embodiments of the present invention, without suggesting any limitation to the scope of the present invention. Wherein.

| Reference signs | |
|---|---|
| fracturing system | 100 |
| fracturing unit | 101 |
| sand blending unit | 102 |
| mixing unit | 103 |
| clear water tank | 104 |
| control system | 10 |
| fracturing control device | 1 |
| sand blending control device | 2 |
| mixing control device | 3 |

DETAILED DESCRIPTION OF EMBODIMENTS

Reference will now be made to the drawings to describe in detail the embodiments of the present disclosure. The description here is only about preferred embodiments of the present invention, and those skilled in the art would envision, on the basis of the preferred embodiments described herein, other manners that can implement the present disclosure, which also fall into the scope of the present invention.

Figure 1:
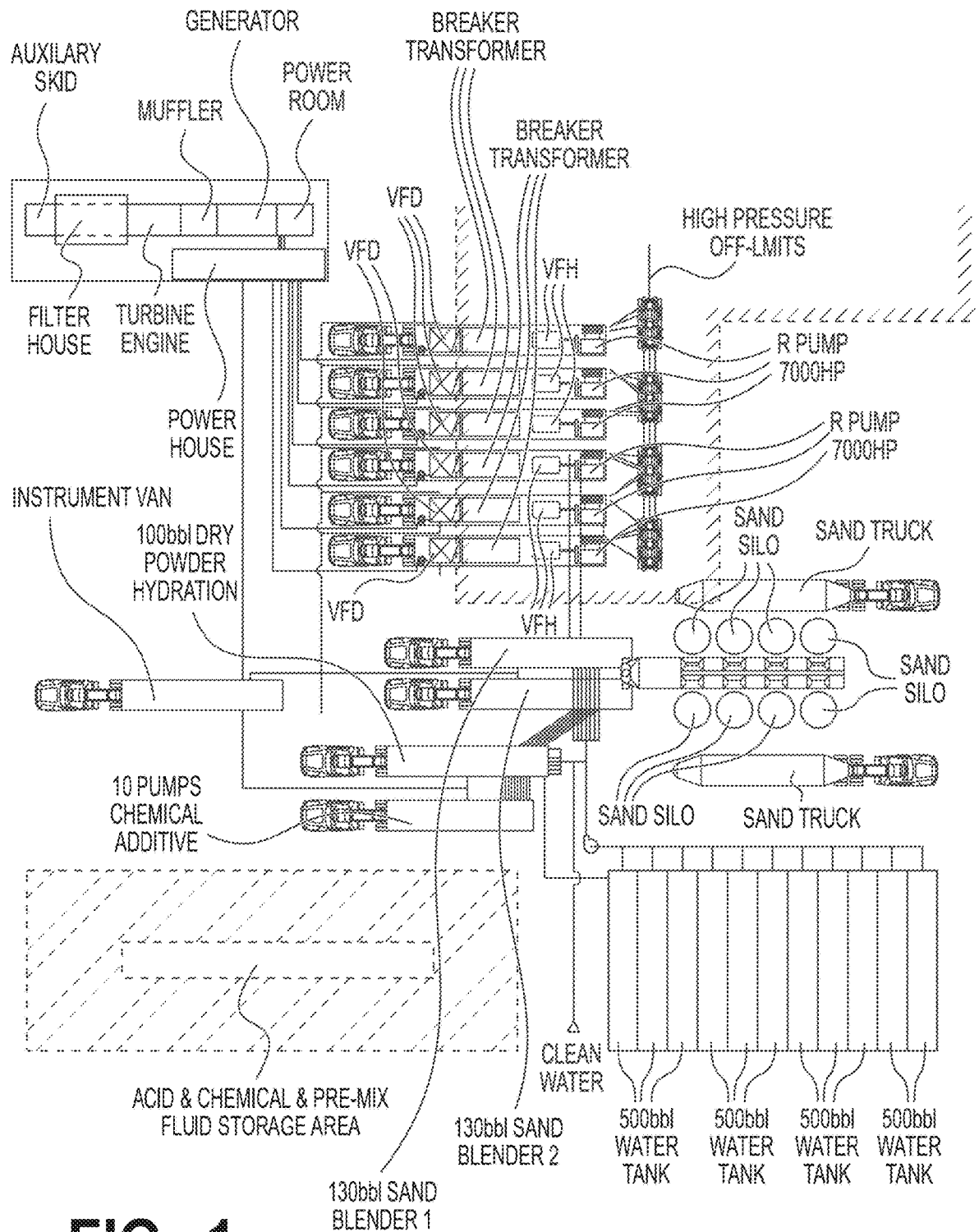
FIG. 1 schematically depicts a structural diagram of a fracturing system used in wellsite operation.
Figure 2:
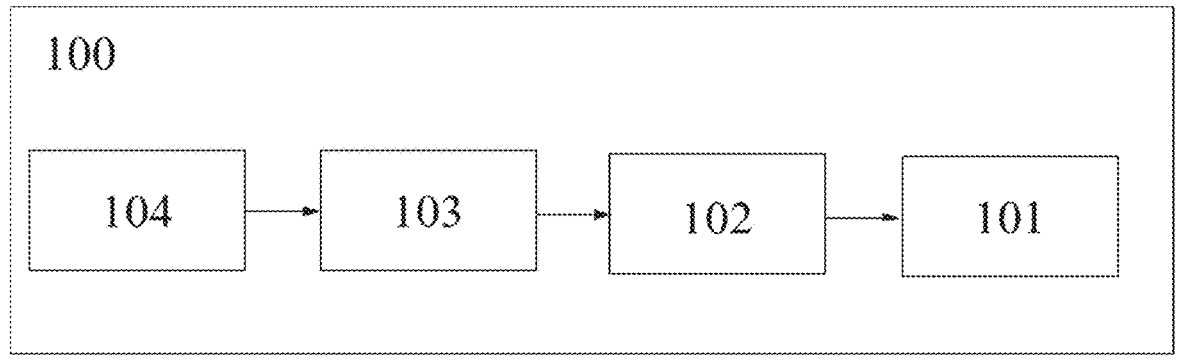
FIG. 2 schematically depicts a block diagram of the fracturing system.
Figure 3:
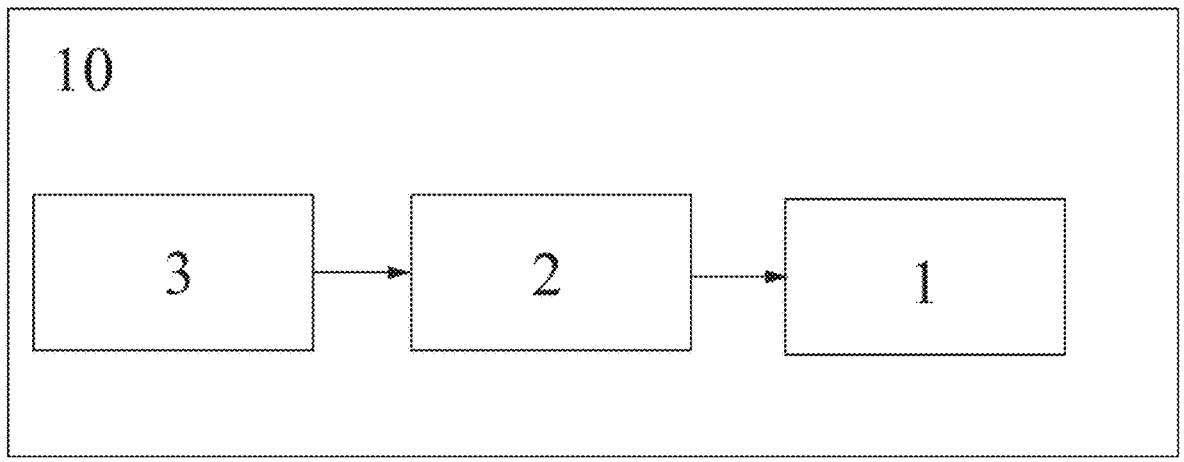
FIG. 3 schematically depicts a structural block diagram of a control system according to the present application.
Figure 4:
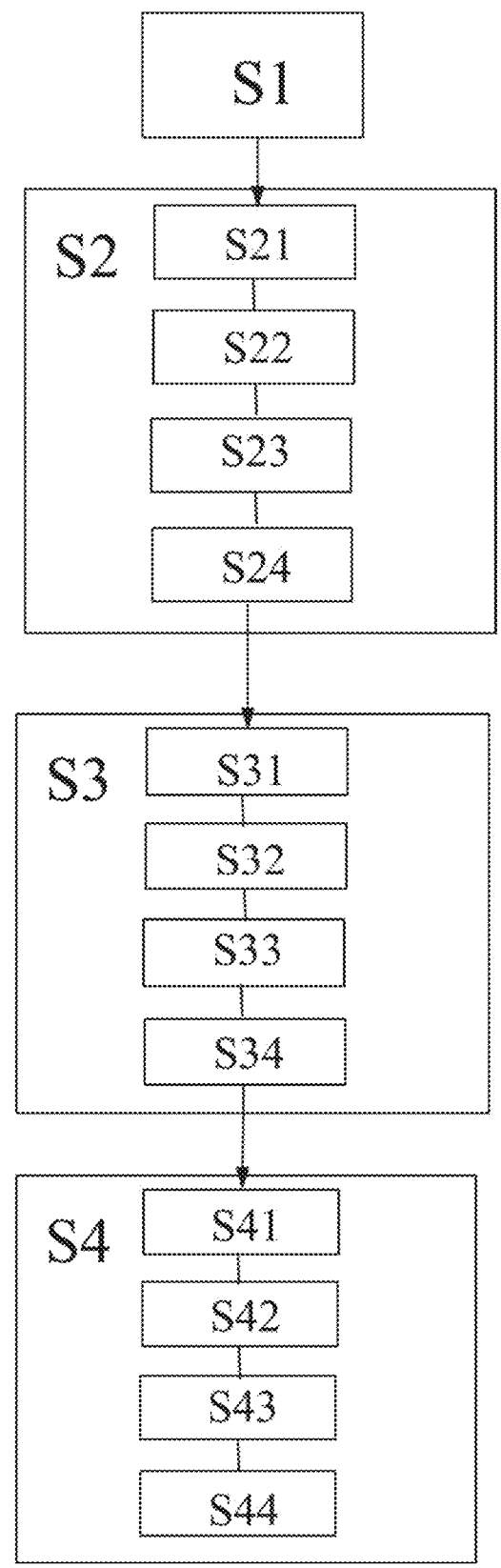
FIG. 4 schematically depicts a flowchart of the method according to the present application.

A Fracturing system 100, which is often used in wellsite operation, comprises a clear water tank 104, a mixing unit 103, a sand blending unit 102 and a fracturing unit 101. FIG. 1 exemplarily depicts a layout of the fracturing system in actual wellsite operation. Specifically, in the process of hydrocarbon reservoirs fracturing with the fracturing system 100, the clear water tank 104 is used to store clear water and quantificationally supply clear water to the mixing unit 103 when it is needed. The mixing unit 103 is used to mix clear water with additives such as dry powder or mix dry powder or liquid thickener with clear water to generate fracturing fluid for fracturing operations. The generated fracturing fluid may be stored in fracturing fluid tanks or directly supplied to the sand blending unit 102. After that, the sand blending unit 102 blends fracturing fluid with proppants, including such as sand and other chemical additives, in a certain proportion, and then supplies the resulted mixture to the fracturing unit 101 through a low-pressure pipeline. Within the scope of the present application, the fracturing unit 101 generally comprises a plurality of (at least two) fracturing mechanisms, such as fracturing pumps, the fracturing mechanisms being able to pump a certain flow of fracturing fluid which is blended with additives and conveyed through low-pressure pipelines to the wellhead, so as to achieve a certain pressure.

The present application discloses a control system 10 for the fracturing system 100 described above, which can perform linkage control on each device of the fracturing system 100, and realize overall control on the fracturing system 100 according to desired wellhead pressure of the wellsite.

The control system 10 disclosed in the present application comprises: a fracturing control device 1 for controlling fracturing unit 101, a sand blending control device 2 for controlling sand blending unit 102 and a mixing control device 3 for controlling mixing unit 103.

Specifically, in a case where there is desired wellhead pressure or target wellhead pressure, the fracturing control device 1 can control the fracturing unit 101 so as to control the pressure of the fracturing fluid discharged by the fracturing unit 101, to achieve the target wellhead pressure. In this case, according to the operation principle of wellsite devices, the fracturing control device 1 controls and adjusts the pressure of the fracturing fluid input to the fracturing unit 101, that is, target sand blending pressure, and transmits the signal of the control amount to the sand blending control device 2. Therefore, the sand blending control device 2 controls various devices of the sand blending unit 102 to achieve the target sand blending pressure, that is, to achieve the discharge pressure of the fracturing fluid required to be discharged from the sand blending unit 102, so as to meet the requirements of the fracturing unit.

It can be appreciated that, generally the discharge manifold of the sand blending unit 102 is coupled with the suction end of the plunger pump of the fracturing unit 101 via pipelines. The sand blending unit 102 ensures a stable discharge pressure at the sand blending section by controlling rotation speed of discharge pump, the main function of which is to ensure that the pressure at the suction end of the fracturing unit 101 can meet the operation requirements of the plunger pump. The displacement of the fracturing unit changes in the operation process. Under this condition, the sand blending unit 102 can adapt to various operating conditions of different displacements through changing the rotation speed of the discharge pump. Therefore, the sand blending pressure can be characterized by sand blending discharge pressure of the sand blending unit 102, fracturing suction pressure of the fracturing unit 101 or pressure of the connecting manifold between the two units. That is, the target sand blending pressure can be specifically set as the target sand blending discharge pressure, the target fracturing suction pressure or the target pressure of connecting manifold, etc.

In this case, in order to achieve the discharge pressure of fracturing fluid required to be discharged by the sand blending unit 102, it is necessary to control and adjust the rotation speed of the packing auger of the sand blending unit 102

(i.e., corresponding to the amount of blended sand proppants) and the flow rate of mixed fracturing fluid output by the mixing unit 103, so as to obtain the rotation speed of the packing auger and the output flow rate of the mixing unit 103 required to achieve the discharge pressure of the sand blending unit 102. Herein, the sand blending control device 2 transmits the desired output flow signal of the mixing unit 103 to the mixing control device 3. The mixing control device 3 controls and adjusts each device of the mixing unit 103 based on the received desired output flow signal, that is, controls the suction pump for sucking additives, the flow rate of clear water supplied by the clear water tank 104 and the amount of dry powder of the mixing unit 103, thereby achieving the desired output flow rate. In this process, data exchange among various control devices may be realized through various communication methods, such as analog signal, pulse signal, Ethernet, 485 communication, 232 communication, CAN communication, WIFI signal and Bluetooth signal, etc.

In some embodiments of the present application, it may be provided that each control device of the control system 10 performs linkage closed-loop control respectively on the fracturing unit 101 and/or the sand blending unit 102 and/or the mixing unit 103.

Specifically, since the wellhead pressure during wellsite operation is proportional to the flow rate of fracturing fluid output by the fracturing unit 101, flow rate corresponding to total fracturing fluid required to be output by the fracturing unit 101, i.e. target fracturing discharge amount, can be acquired according to the required wellhead pressure (i.e. target wellhead pressure). Besides, the target fracturing discharge amount (or the target fracturing pressure corresponding thereto) can be acquired in other manners, for example, it can be manually controlled by operators on site according to construction situation of field operations, or defined by process requirements, or it can also be automatically determined by the control system according to operating conditions inside the wellbore by the intelligent system through software calculation.

In this case, fracturing pressure deviation between the target fracturing pressure and current fracturing pressure of the fracturing unit 101 can be acquired, and such deviation is taken as an input value of dynamic feedback control. Then, based on the fracturing pressure deviation, fracturing pressure increment of the fracturing unit 101 at the operating condition point corresponding to the target fracturing pressure can be acquired through, for example, a dynamic table look-up model. Then, the target fracturing pressure is superimposed with the fracturing pressure increment, and the result is set as discharge pressure of fracturing fluid required to be discharged for the sand blending unit 102, that is, target sand blending pressure, and the signal is transmitted to the sand blending control device 2.

For example, taking the sand blending discharge pressure of the sand blending unit 102 as the characterization of the sand blending pressure here. Similarly, the sand blending control device 2 acquires target sand blending input amount (i.e., rotation speed of the packing auger for adding sand proppants as well as the flow rate of fracturing fluid conveyed by the mixing unit 103) of the sand blending unit 102 according to the target sand blending discharge pressure through, for example, static table look-up. And sand blending discharge pressure deviation (i.e., the sand blending pressure deviation) between the target sand blending discharge pressure and current sand blending discharge pressure of the sand blending unit 102 can be acquired, then a sand blending input amount increment of the sand blending unit 102 can be obtained based on the sand blending discharge pressure deviation through, for example, dynamically table look-up. Then, by superimposing the target sand blending input amount acquired thorough static table look-up under stable conditions and the increment of sand blending input amount acquired through dynamic table look-up, flow rate of fracturing fluid required to be discharged to the sand blending unit 102, that is the target mixing discharge amount, can be set for the mixing unit 103, and the signal is transmitted to the mixing control device 3.

Similarly, the mixing control device 3 can acquires target mixing input amount (i.e., required flow rate of clear water, flow rate of dry powder, etc.) through, for example, static table look-up, according to the target mixing discharge amount (i.e., the flow rate of fracturing fluid required to be conveyed to the sand blending unit 102). And mixing amount deviation between the target mixing discharge amount and current mixing discharge amount of the mixing unit 103 can be acquired, then mixing input amount increment can be obtained based on the mixing amount deviation through, for example, dynamic table look-up. After that, by superimposing the target mixing input amount and the mixing input amount increment, desired raw material supply amount (i.e., amount of clear water, dry powder as well as other additives) is set for the fracturing system 100, thereby realizing the overall control of the fracturing system 100.

In addition, the mixing control device 3 may also take the liquid level of mixing tank of the mixing unit 103 as a control target. A discharge port of the mixing tank is connected to a suction port of the sand blending unit 102, and the sand blending pump sucks liquid from the mixing tank. When discharge amount changes, the liquid level in the mixing tank will be affected. At this time, the mixing input amount conveyed to the mixing tank, that is, the required flow rate of clear water and dry powder, etc., is adjusted to keep the liquid level in the mixing tank stable, thereby realizing control on the mixing unit 103.

In some embodiments of the present application, the fracturing control device 1 and/or the sand blending control device 2 and/or the mixing control device 3 of the control system 10 may also monitor the actual output amount of the fracturing unit 101 and/or the sand blending unit 102 and/or the mixing unit 103, such as rotation speed of a packing auger, rotation speed of a suction pump, flow rate of fracturing fluid, etc., so as to identify whether any error occurs in devices.

In some embodiments, the fracturing control device 1 further comprises a fracturing fluid distribution unit, which distributes flow of fracturing fluid required to be pumped out to each fracturing mechanism of the fracturing unit 101, such as fracturing pumps, according to the target fracturing pressure or the target fracturing discharge amount. For example, when one or a part of fracturing mechanisms in the fracturing unit 101 fails, the fracturing fluid discharge distribution unit can distribute flow of fracturing fluid required to be pumped out among normally operating fracturing mechanisms.

In some embodiments, the control system 10 further comprises a clear water tank control unit, which controls to feed water to the clear water tank 104 of the fracturing system 100 when liquid level of the clear water tank 104 is lower than a preset minimum liquid level. Of course, the clear water tank control unit can also control the clear water tank 104 through other control logic according to specific using occasions and requirements.

In addition, the present application further relates to a fracturing system 100, which comprises a clear water tank 104, a mixing unit 103, a sand blending unit 102, a fracturing unit 101 and a control system 10 according to any embodiment of the present application. In some embodiments, the sand blending unit 102 comprises a sand conveying belt and a packing auger, wherein the sand conveying belt provides sand proppants for the packing auger, and the rotation speed of the packing auger is adjusted by the sand blending control device 2. The arrangement of fluidity storage mechanism such as the sand conveying belt avoids influence on the operation of the fracturing system 100 due to insufficient stored sand proppants in some cases.

The control system disclosed in the present application can realize linkage control among various devices of the fracturing system, thus reducing cost and burden of manual control. In addition, it can also monitor state of each device of the fracturing system, with identifying errors when the output value exceeds normal range.

The present application further discloses a method for controlling the fracturing system 100 in wellsite operation, which specifically comprises the following steps:

Step S1: Acquiring a target fracturing pressure of the fracturing unit 101;

Specifically, the target fracturing pressure of the fracturing unit 101 can be acquired based on wellhead pressure, manual input, process requirements or software calculation.

Step S2: Taking the target fracturing pressure as a control target, performing closed-loop control on the fracturing unit 101 and setting a target sand blending pressure for the sand blending unit 102;

Specifically, the pressure of fracturing fluid input to the fracturing unit 101, i.e., the target sand blending pressure, is controlled and adjusted.

Step S3: Taking the target sand blending pressure as a control target, performing closed-loop control on the sand blending unit 102, and setting a target mixing discharge amount for the blending 103.

In order to achieve the pressure of fracturing fluid required to be discharged by the sand blending unit 102 or the pressure at suction end of the fracturing unit 101, it is necessary to control and adjust the rotation speed of the packing auger of the sand blending unit 102 which corresponds to the amount of blended sand proppants) and the flow rate of mixed fracturing fluid output by the mixing unit 103, so as to obtain the rotation speed of the packing auger as well as the output flow rate of the mixing unit 103 (i.e., the target mixing discharge amount) for achieving the required output flow of the sand blending unit 102.

Step S4: Taking the target mixing discharge amount as a control target, performing closed-loop control on the mixing unit 103 and setting a desired raw material supply amount for the fracturing system 100.

Specifically, each device of the mixing unit 103 is controlled and adjusted based on the received desired output flow signal, that is, the suction pump for sucking additives, the flow rate of clear water supplied by the clear water tank 104 as well as the amount of dry powder of the mixing unit 103 are controlled, thereby realizing the desired output flow rate.

In some embodiments of the present application, linkage closed-loop control is performed respectively on the fracturing unit 101 and/or the sand blending unit 102 and/or the mixing unit 103.

Specifically, step S21: acquiring target fracturing pressure of the fracturing unit 101. Herein, step S22: acquiring fracturing pressure deviation between the target fracturing pressure and current fracturing pressure of the fracturing unit 101, and taking the deviation as an output of dynamic feedback control. The followed step is S23: based on the fracturing pressure deviation, acquiring fracturing pressure increment of the fracturing unit 101 at the operating condition point corresponding to the target fracturing pressure through, for example, dynamically table look-up model. Then the step S24: superimposing the target fracturing pressure with the fracturing pressure increment, and taking the result as the discharge pressure of fracturing fluid required to be discharged for the sand blending unit 102, that is, the target sand blending pressure.

Similarly, step S31: acquiring target sand blending input amount of the sand blending unit 102 (that is, the rotation speed of the packing auger for adding sand proppants as well as the flow rate of fracturing fluid conveyed by the mixing unit 103) according to the target sand blending pressure through, for example, static table look-up. Furthermore, step S32: acquiring sand blending pressure deviation between the target sand blending pressure and current sand blending pressure of the sand blending unit 102. Step S33: acquiring sand blending input amount increment of the sand blending unit 102 based on the sand blending pressure deviation through, for example, dynamic table look-up. Then, step S34: by superimposing the target sand blending input amount acquired through static table look-up under stable conditions and the sand blending input amount increment acquired by dynamic table look-up, setting the flow rate of fracturing fluid required to be discharged to the sand blending unit 102, that is, the target mixing discharge amount, for the mixing unit 103.

Similarly, step S41: acquiring target mixing input amount (i.e., required flow rate of clear water, flow rate of dry powder, etc.) through, for example, static table look-up, according to the target mixing discharge amount, i.e., the flow rate of fracturing fluid required to be conveyed to the sand blending unit 102. And step S42: acquiring mixing amount deviation between the target mixing discharge amount and current mixing discharge amount of the mixing unit 103, so as to perform step S43: acquiring mixing input amount increment based on the mixing amount deviation through, for example, dynamic table look-up. And then, step S44: by superimposing the target mixing input amount and the mixing input amount increment, setting the desired raw material supply amount, i.e., the amount of clear water, dry powder as well as other additives, for the fracturing system 100, so as to control the whole fracturing system 100. Alternatively, the adjustment and control of the flow of clear water and the flow of dry powder can also be achieved through maintaining the liquid level in the mixing tank of the mixing unit 103 at a predetermined level.

In some embodiments of the present application, the actual output amount of the fracturing unit 101 and/or the sand blending unit 102 and/or the mixing unit 103, i.e., the rotation speed of the packing auger, the rotation speed of the suction pump, the flow rate of fracturing fluid, etc., may further be monitored so as to identify whether any error occurs in devices.

In some embodiments, flow of fracturing fluid required to be pumped out to each fracturing mechanism of the fracturing unit 101, such as fracturing pumps, may further be distributed according to the target fracturing pressure. For example, when one or a part of fracturing mechanisms in the fracturing unit 101 fails, flow of fracturing fluid required to be pumped out may be distributed among normally operating fracturing mechanisms.

In some embodiments, liquid level of the clear water tank 104 of the fracturing system 100 may further be controlled, that is, controlling the clear water tank 104 of the fracturing system 100 to feed water when the liquid level of the clear water tank 104 is lower than a preset minimum liquid level. Of course, the clear water tank 104 may also be controlled through other control logic according to specific using occasions and requirements.

It can be appreciated that in wellsite operation, since the wellhead pressure is proportional to the flow rate of fracturing fluid output by the fracturing unit 101, according to the required wellhead pressure (i.e. the target wellhead pressure), the flow rate corresponding to total fracturing fluid required to be output by the fracturing unit 101, i.e. the target fracturing discharge amount, can be acquired. For example, the target fracturing pressure has a target fracturing input amount corresponding thereto. Therefore, in the above-mentioned control methods, the adjustment and control of the fracturing pressure can also be indirectly realized by adjusting and controlling the input and output amount of fracturing fluid of the fracturing unit 101. Such methods also fall within the spirit and scope of the inventive of the present application.

The foregoing description on the various embodiments of the present invention has been presented to those skilled in the relevant fields for the purpose of illustration, but is not intended to be exhaustive or limited to a single embodiment disclosed herein. As aforementioned, many substitutions and variations will be apparent to those skilled in the art. Therefore, although some alternative embodiments have been described above, those skilled in the art can envision or develop other embodiments according to the present invention. The present disclosure is intended to cover all substitutions, modifications and variations of the embodiments described herein, as well as other embodiments falling into the spirits and scope of the present invention.

What is claimed is:

1. A method for controlling a fracturing system in wellsite operation, the fracturing system comprising a fracturing unit for fracturing hydrocarbon reservoirs and a sand blending unit for blending fracturing fluid and proppants and supplying blended mixture to the fracturing unit, the method comprising:
maintaining a target fracturing pressure at the fracturing unit by using as feedback a fracturing pressure deviation between the target fracturing pressure and a current fracturing pressure of the fracturing unit;
obtaining a target sand blending pressure by adding the target fracturing pressure and the fracturing pressure deviation; and
maintaining the target sand blending pressure at the sand blending unit by using as feedback a sand blending pressure deviation between the target sand blending pressure and a current sand blending pressure of the sand blending unit.

2. The method of claim 1, further comprising:
obtaining a target mixing discharge amount by adding a target sand blending input amount and a sand blending input amount increment; and
maintaining the target mixing discharge amount at a mixing unit by using as feedback a mixing amount deviation between the target mixing discharge amount and a current mixing discharge amount.

3. The method of claim 2, further comprising:
acquiring the target blending input amount according to the target mixing discharge amount;
acquiring a mixing amount deviation between the target mixing discharge amount and a current mixing discharge amount of the mixing unit;
acquiring a mixing input amount increment of the mixing unit based on the mixing amount deviation;
obtaining a sum of the target mixing input amount and the mixing input amount increment, and
setting the sum as a raw material supply amount.

4. The method of claim 2, further comprising:
acquiring a sand blending input amount increment based on the sand blending pressure deviation in a dynamic look-up table.

5. The method of claim 4, further comprising:
monitoring an actual output amount of the fracturing unit, the sand blending unit, and the mixing unit to determine whether an error is present.

6. The method of claim 5, further comprising:
distributing fracturing fluid to fracturing mechanisms of the fracturing unit according to the target fracturing pressure.

7. The method of claim 6, further comprising:
fill water into a water tank when a liquid level of the water tank is lower than a preset minimum liquid level.

8. The method of claim 1, further comprising:
acquiring the target fracturing pressure from a static look-up table.

9. The method of claim 1, further comprising:
acquiring the target fracturing pressure from a wellhead pressure, a manual input, process requirements, or software calculation.

10. A method for controlling a fracturing system in wellsite operation, the fracturing system comprising a fracturing unit for fracturing hydrocarbon reservoirs and a sand blending unit for blending fracturing fluid and proppants and supplying blended mixture to the fracturing unit, the method comprising:
acquiring a target fracturing pressure of the fracturing unit;
performing first loop control on the fracturing unit with the target fracturing pressure as a first control target;
setting a target sand blending pressure for the sand blending unit according to the target fracturing pressure and a fracturing pressure deviation between the target fracturing pressure and a current fracturing pressure of the fracturing unit; and
performing second loop control on a sand blending unit with the target sand blending pressure as a second control target.

11. The method of claim 10, further comprising:
adjusting a rotational speed of a packing auger that receives sand proppants.

12. The method of claim 10, further comprising:
setting a target mixing discharge amount for a mixing unit;
performing third loop control on the mixing unit; and
setting a raw material supply amount for the fracturing system with the target mixing discharge amount as a third control target.

13. The method of claim 12, further comprising:
acquiring the fracturing pressure deviation between the target fracturing pressure and the current fracturing pressure of the fracturing unit;
acquiring a fracturing pressure increment of the fracturing unit based on the fracturing pressure deviation;
obtaining a first sum of the target fracturing pressure and the fracturing pressure increment;
setting the first sum as the target sand blending pressure for the sand blending unit;
acquiring a target sand blending input amount of the sand blending unit according to the target sand blending pressure; acquiring a sand blending pressure deviation between the target sand blending pressure and a current sand blending pressure of the sand blending unit;

acquiring a sand blending input amount increment of the sand blending unit based on the sand blending pressure deviation;

obtaining a second sum of the target sand blending input amount and the sand blending input amount increment;

setting the second sum as a target mixing discharge amount for the mixing unit; and acquiring a target blending input amount of the mixing unit according to the target mixing discharge amount;

acquiring a mixing amount deviation between the target mixing discharge amount and a current mixing discharge amount of the mixing unit;

acquiring a mixing input amount increment of the mixing unit based on the mixing amount deviation;

obtaining a third sum of the target mixing input amount and the mixing input amount increment, and setting the third sum as the raw material supply amount for the fracturing system.

14. The method of claim 13, further comprising:

acquiring the target fracturing pressure, the target sand blending input amount, and the target mixing input amount from static look-up tables.

15. The method of claim 14, wherein acquiring the fracturing pressure increment comprises acquiring the fracturing pressure increment from a first dynamic look-up table at an operating condition point of the target fracturing pressure based on the fracturing pressure deviation;

wherein acquiring the sand blending input amount increment comprises acquiring the sand blending input amount increment from a second dynamic look-up table at an operating condition point of the target sand blending input amount based on the sand blending pressure deviation; and wherein acquiring the mixing input amount increment comprises acquiring the mixing input amount increment from a third dynamic look-up table at an operating condition point of the target mixing input amount based on the mixing amount deviation.

16. The method according to claim 15, further comprising:

monitoring an actual output amount of the fracturing unit, the sand blending unit, and/or the mixing unit to identify whether an error occurs.

17. The method of claim 16, further comprising:

distributing fracturing fluid to various fracturing mechanisms of the fracturing unit according to the target fracturing pressure.

18. The method of claim 17, further comprising:

controlling a clear water tank of the fracturing system to feed water when a liquid level of the clear water tank is lower than a preset minimum liquid level.

19. The method of claim 12, further comprising:

transmitting an output flow signal of the mixing unit to a mixing control device.

20. The method of claim 10, further comprising:

acquiring the target fracturing pressure of the fracturing unit according to a wellhead pressure, a manual input, process requirements, or software calculation.

\* \* \* \* \*